United States Patent

[11] 3,616,162

| [72] | Inventor | Jean H. Noziere<br>Clermont, France |
|---|---|---|
| [21] | Appl. No. | 792,402 |
| [22] | Filed | Jan. 21, 1969 |
| [45] | Patented | Oct. 26, 1971 |
| [73] | Assignee | Compagnie de Saint<br>Gobain, Neuilly sur Seine, France |

[54] AUTOGENOUSLY INTERCONNECTED AND COMPRESSED POLYSTYRENE PEARLS
10 Claims, 8 Drawing Figs.

[52] U.S. Cl..................................... 161/133,
161/161, 161/162, 161/166, 161/168, 260/2.5,
264/113, 264/126
[51] Int. Cl..................................... B32b 5/08,
B32b 5/14, B32b 5/32
[50] Field of Search.............................. 260/2.5 B,
2.5 AK; 264/41, 46, 112, 113, 123, 126, 125, 234,
321; 161/161, 133, 162, 168, 166

[56] References Cited
UNITED STATES PATENTS

| 2,865,800 | 12/1958 | Stastny ........................ | 161/160 |
| 2,894,918 | 7/1959 | Killoran et al. ............... | 260/2.5 |
| 2,899,708 | 8/1959 | Donaldson et al. ........... | 264/321 |
| 3,104,196 | 9/1963 | Shannon........................ | 117/138.8 |
| 3,374,300 | 3/1968 | Azuma ......................... | 264/46 |

*Primary Examiner*—William J. Van Balen
*Attorneys*—Dale A. Bauer, John L. Seymour and Bauer and Seymour

ABSTRACT: Objects of expanded polystyrene pearls are made in sandwiches of which the layers differ in their constitution, the size of the pearls, their densities and the like. Such objects are stronger, more flexible, and provide better sound and heat insulation than objects of like thickness made from a single type of material. Sandwiches of cellular polystyrene and cellular polysulfone, and sandwiches of different kinds of cellular polystyrene, or different polysulfones exemplify the invention. Novel machinery is provided for making the new materials.

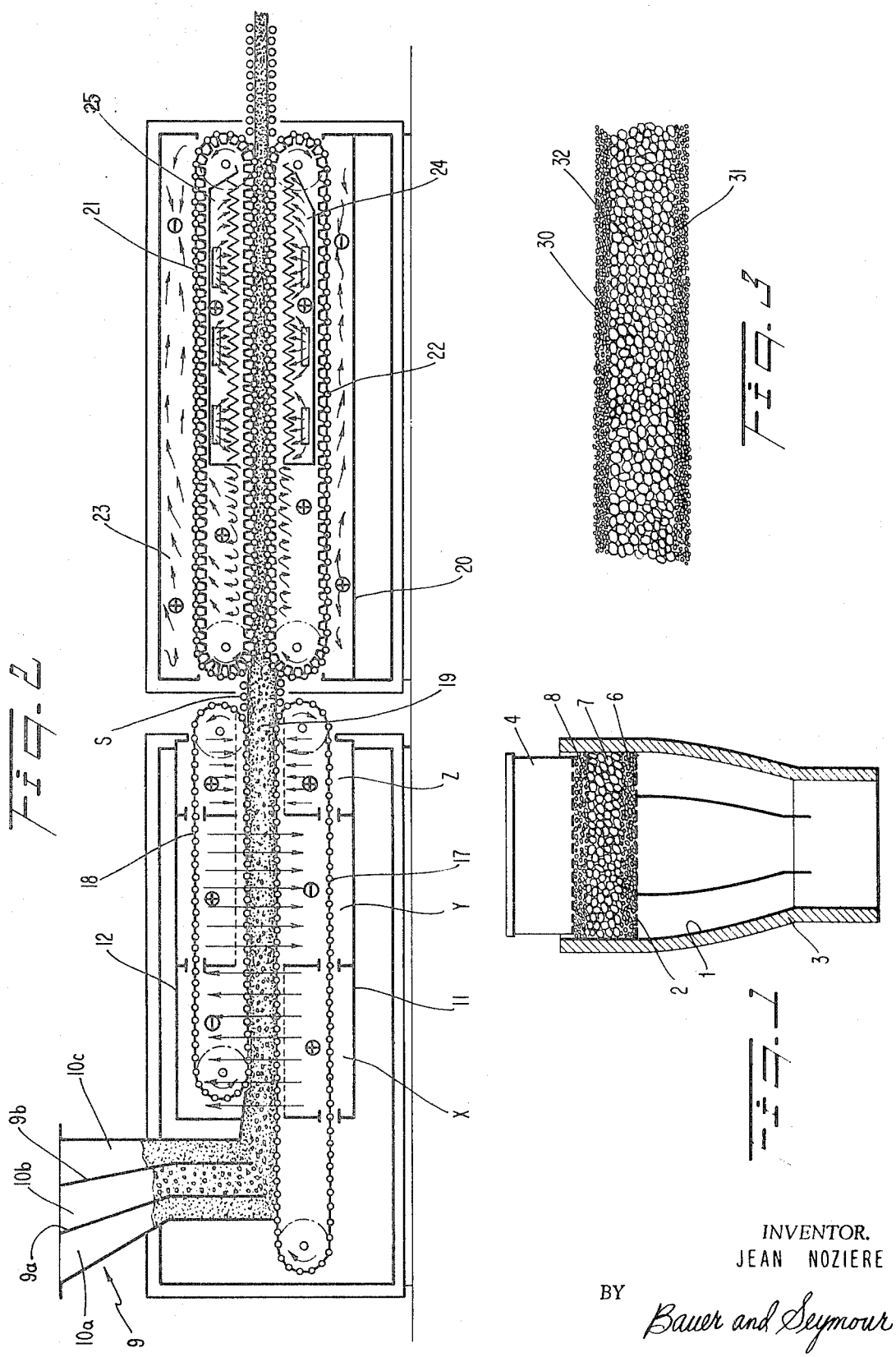

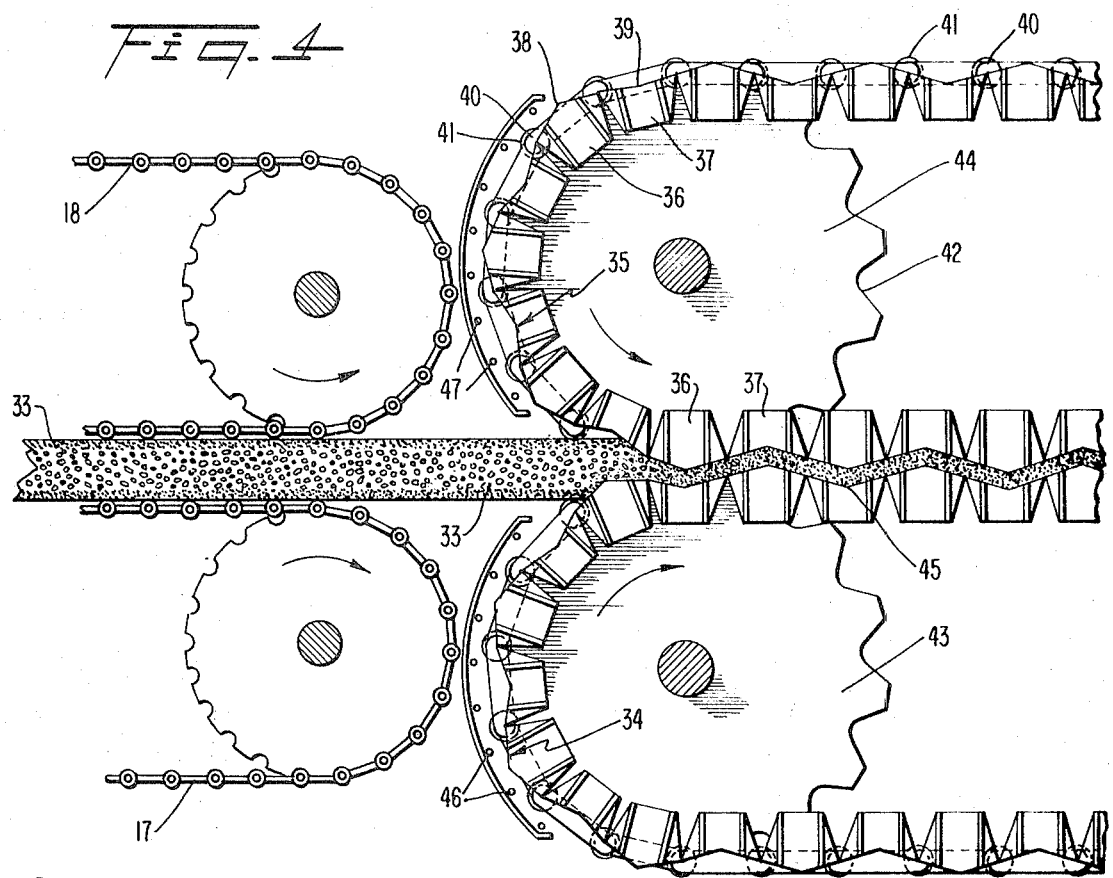
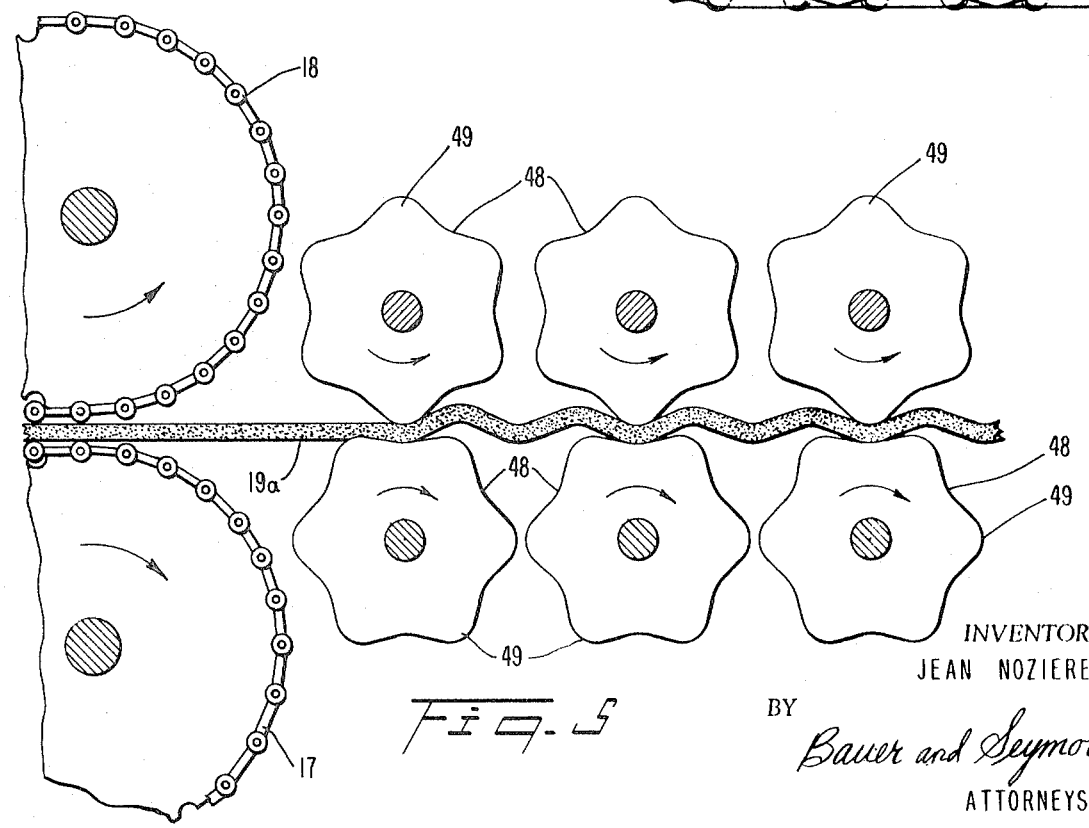

PATENTED OCT 26 1971

INVENTOR.
JEAN NOZIERE
BY
Bauer and Seymour
ATTORNEYS

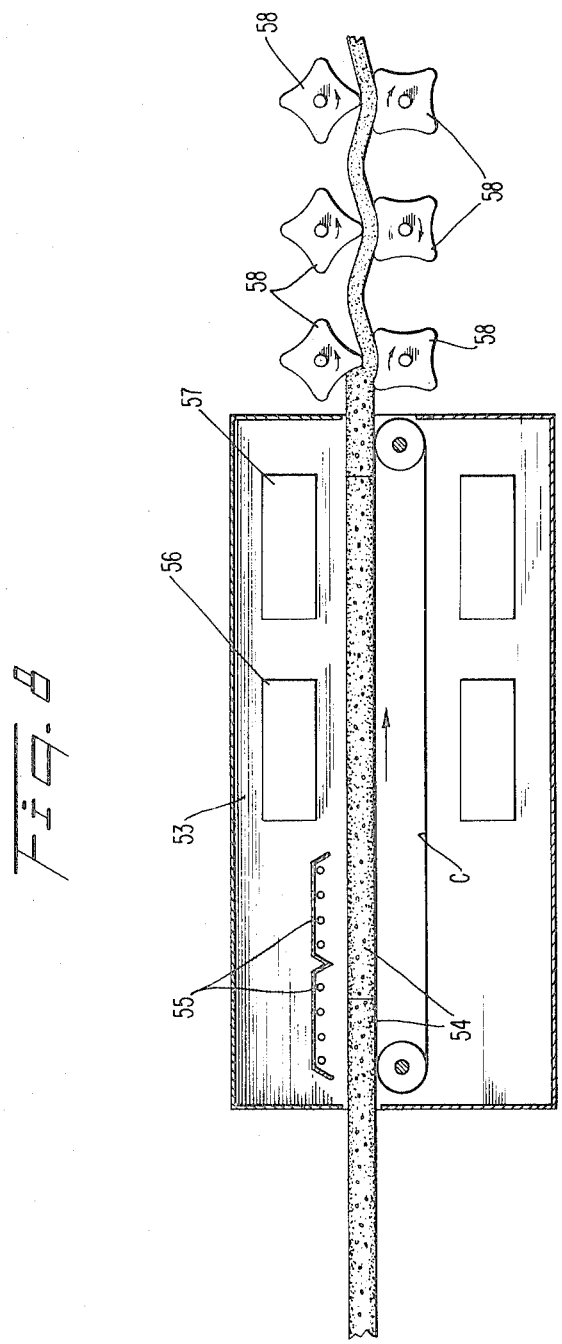

3,616,162

AUTOGENOUSLY INTERCONNECTED AND COMPRESSED POLYSTYRENE PEARLS

This invention relates to the manufacture of cellular thermoplastic objects, particularly to building materials such as novel plates, and layered cellular materials. It has particular relation to the use of expanded polystyrene pearls to make rigid, shaped foams, and to the making of such articles of manufacture in layers including layers of pearls of materials other than but compatible with polystyrene. It includes novel machines for the continuous or intermittent production of such objects.

A first characteristic of the invention is to produce sheets of cellular polystyrene having at least two layers differing in at least one of the characteristics of density, size of cells, and composition. A valuable form of novel material is a sheet being a sandwich of coarse, interwelded cells welded between outer layers of fine interwelded cells. These novel products are superior in mechanical properties and in insulating powers.

In another characteristic of the invention the pearls of contiguous layers are of different composition but compatible with and capable of being welded by heat to polystyrene pearls. The polysulfone pearls are notably successful in this use.

The invention also includes self-extinguishing objects of this composition, such as self-extinguishing wallboard. To provide this property the pearls used contain a small percentage of halogenated hydrocarbons or halogenated organic phosphorus compounds, especially the phosphenates. The halogen included in such compounds is usually either Cl or Br.

In the manufacture of such materials it is part of the invention to weld the pearls and the layers together by heat, and while the sandwich is still hot and flexible, to shape it, for instance to include surface designs, undulations, ribs, or angular or arcuate shape.

The accompanying drawings illustrate apparatus for the manufacture of such novel products. The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a vertical section of simple apparatus for the unit production of disks or plates;

FIG. 2 is a vertical longitudinal section through apparatus for continuous manufacture of sheet;

FIG. 3 is a vertical cross section through sheet having dense outer layers;

FIG. 4 is a diagrammatic elevation, partly in section, of apparatus for producing a compressed sheet having transversely extending ribs;

FIG. 5 is a diagrammatic elevational view of apparatus for producing undulations in a sheet the dimensions of which are already fixed;

FIG. 8 is a diagram in elevation and part section of apparatus for heating and shaping cold sheet.

Figure 6:
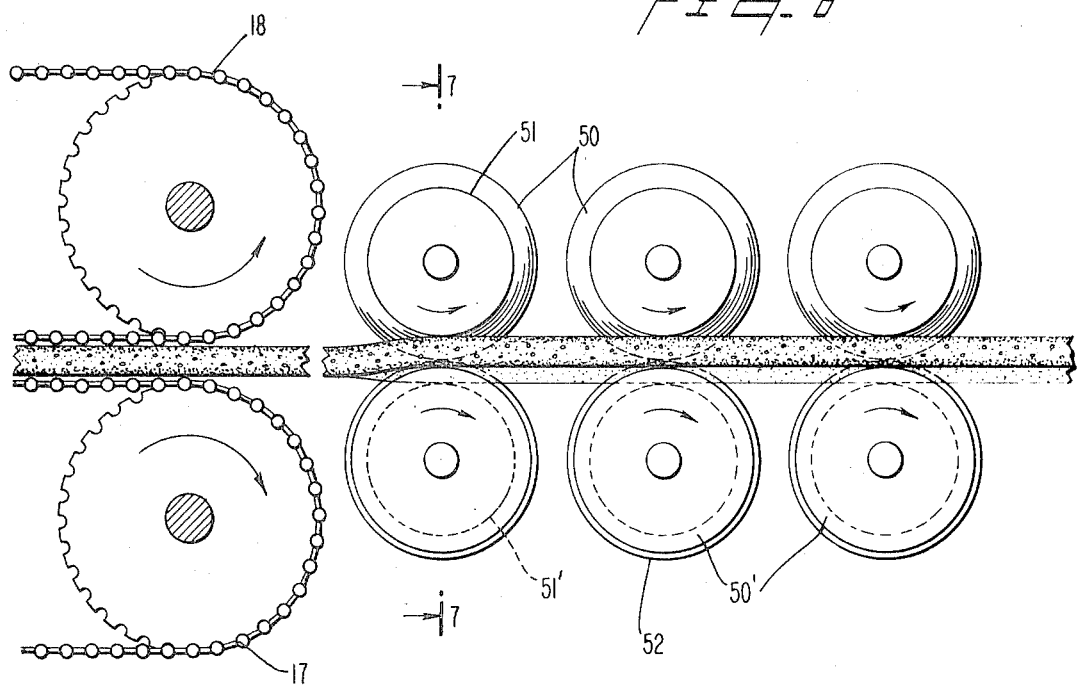
FIG. 6 is an elevational view, from the side, of apparatus for producing sheet with longitudinally extending channels.

The building board and sheet insulation industry is in the infancy of the use of cellular sheet materials. Some research has been done along such lines but the industry, for instance as to wallboard, is largely bound to cellulose and asbestos types which are unsatisfactory, furnishing neither adequate sound nor heat insulation. Their inadequacy has been the subject of grave protest from apartment house dwellers and the subject of extensive investigation by news media.

It is a particular object of this invention to supply the building and insulating industries with sheet board of cellular type, having a base of polystyrene, which is stronger than known types of cellular products, and possesses very high insulating characteristics both as to heat and sound. It is also an object to produce such sheet in corrugated, zigzag, and imprinted types to enhance strength and improve appearance.

The objects as to process are accomplished, generally speaking, by a method of making shaped articles of rigid foam comprising polystyrene which comprises forming a plurality of layers comprising expanded polystyrene pearls to about the softening point of the pearls in the layers, pressing the layers into the shape and to the density desired in the product, and cooling the shaped piece under continued pressure. The objects as to product are accomplished by polystyrene plyboard having at least one ply of autogenously interconnected, compressed polystyrene pearls which is autogenously connected to at least one other ply of autogenously interconnected, compressed pearls which differ from the pearls of said one ply in at least one of the factors of constitution, size, and density. The objects as to apparatus are accomplished by the apparatus of novel design herein described.

Referring to FIG. 1 there is illustrated the apparatus and a process for making insulating pads one by one for use e.g. as table pads to support hot dishes. A metal mold 1 internally equipped with a plunger 2 capable of being ejected by thrust from below, receives a first layer of expanded polystyrene pearls 6 of small diameter, upon which are placed a second layer of larger pearls of approximately twice the diameter of those of the first layer. The second layer is covered by another layer of pearls like the first layer. The layers may be of any chosen thickness, equal or unequal and are at self-welding temperature so that when compressed they will autogenously join to contiguous pearls. Pressure is then applied by upper mold member 4, a plunger, which compresses the layers to selected thickness. Cooling is accomplished in many instances while the pressure is maintained. When the product is set it may be ejected from the mold.

In FIG. 3 is shown a product of the type made by the present process, the layers 30, 31 are of fine, expanded polystyrene pearls and the inner layer 32 is of larger polysulfone pearls, also expanded in advance.

In FIG. 2 is illustrated apparatus for the continuous production of sheet board for use inter alia in the building industry for walls and ceilings. A hopper 9 is divided transversely by partitions 9a, 9b into three compartments 10a, b, c each of which receives continuously a supply of thermoplastic pearls of which at least one kind is different from the others in constitution, granulometry, or density. The kind in the central part of the hopper is shown to be different from the kind in the outer parts. This hopper deposits a first layer upon a belt conveyor H17, a second upon the first and a third upon the second. The belt travels through an oven 11, 12 which is laterally divided into three compartments X, Y, Z. An upper belt conveyor 18 traps the pearls which would otherwise be blown about. In compartment X hot air is blown from suitable inlets upward through the belts and the layers of pearls, exhausting through suitable outlets in the upper part of the compartment. In compartment X the hot air travels downward through the layers. In the third compartment uniformity of temperature is achieved and maintained by injecting hot air under moderate pressure from above and below, assuring the uniform flow of calories into all pearls, a step of great advantage when the layers are thick. The belts, 17, 18 preferably apply substantially no pressure or light pressure. The gap between the edges of the upper and lower belts is usually closed by vertical plates to prevent loss from the sides. As the pearly layers leave belts 17, 18 they are self-welding temperature and sufficiently self-bonded to maintain coherence but supports S may be provided above and below to assist the transfer and prevent sagging if desired.

A second oven 20 encloses belts 21, 22 similar to 17, 18 but spaced to compress the multiplied intermediate product which issues from them. In the drawing the compression reduces thickness by one-half. This oven is divided into two compartments 23 and 24–25, in the first of which hot air maintains the plasticizing temperature of the pearls by injections of hot air from both sides and the second is devoted to cooling the product, its pearls now thoroughly interwelded, until it is stiff and self-supporting, after which it is ejected from the oven, transported on rollers, and cut to size.

Figure 7:
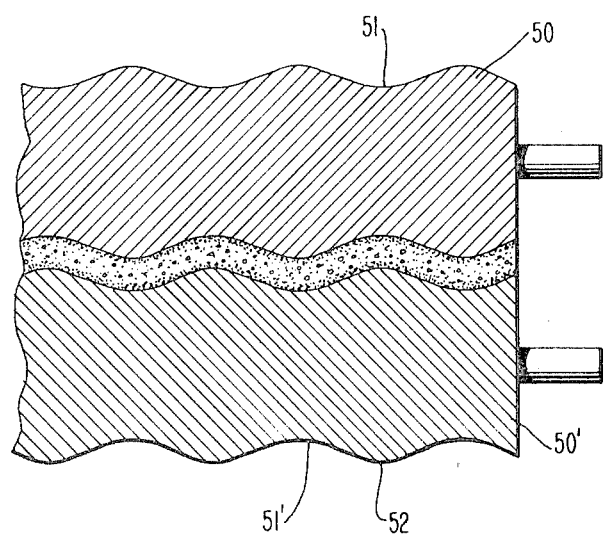
FIG. 7 is a section of line 7—7 of FIG. 6.

In the modification of method and apparatus of FIG. 6, conceived to produce a product strengthened by longitudinally extending channels, giving a transverse zigzag section as in FIG. 7. The belts 17, 18 may be pitched toward each other downstream, being wider spaced at head end than at discharge so as to compress the plies of pearls, the plied product, still hot and plastic, being passed between rollers 50—50' which have circular grooves 51 and opposed lands 52 which bend the hot plastic sheet as in FIG. 7. The sheet may then be passed into a cooling tunnel. In this form of the invention the belts 21, 22 would be eliminated and replaced by rollers such as 50, the spacing of which will combine with the speed of the sheet and the channeled form to prevent sagging between the rollers until sufficient hardness is achieved. The rollers may also be used for further compression if desired.

In FIG. 5 is shown a novel construction for putting transverse channels into the sheet, involving complementary rollers with transversely extending, interfitting lands 49 and grooves 48 which impart to the hot plyboard a zigzag form seen in longitudinal section, imparting resistance to bending about any longitudinal axis. In this case also the series of rollers replaces the belts 21, 22 of FIG. 2. By combining the roller forms of FIGS. 5 and 7 resulting in crossed channels an increase of both longitudinal and lateral strength can be provided.

In many cases it is preferred that the belt system be retained even while imparting zigzag construction to the plyboard, in which case the novel machinery diagrammatically indicated in FIG. 4 may be employed.

This apparatus includes two belts 34, 35 having alternate lands 38 and grooves 39 formed by abutting transverse slats mounted on chain links 40 which pass over sprocket wheels 41 and are journaled on pivots 41, the pivots engaging indentations 42 in the wheels 43–44. All the slats 36, 37 maintain contact with each other along a line which passes through the axes of wheels 41, so that no gaps appear between slats as they turn the wheels to pinch the product as it is engaged. This produces a product with laterally extending channels 45 and zigzags as seen in longitudinal section. Any chosen shape can be given to the slats. The slats may have figures in relief or intaglio to imprint the product as deeply as desired or, for that matter, to form holes in it. In this way packing material for fragile articles such as eggs, fruit and china may be provided with indentations exactly or approximately fitting the articles.

It is also a part of the invention to compress the edges of the sheet more than the center or vice versa, increasing their density. One may thus provide edge reinforcements which can be trimmed to form with rigid edges useful in stacking.

An advantage of this part of the invention is the formation of articles offering maximum protection for minimum consumption of thermoplastic and to impart to such articles different degrees of flexibility appropriate to the protection of articles of different degrees of fragility.

In order to keep the slats of the link belt at the right temperature and also to use it to control the temperature of the plyboard radiant reflector heating means 46, 47, for instance infrared, extend across the upstream ends of the belts and impart the temperature selected for engagement with the plyboard.

In FIG. 8 cold plyboard 54, already cut to size, passes onto a conveyor C within an oven 53 into range of radiant heaters 55 and hot gas heaters 56, 57 which impart such plasticity that the sheets are readily undulated as at 58 and further compressed by the undulating rollers, similar in their construction to the rollers of FIG. 5 but differently spaced when compression is to be used.

The undulated products manufactured with the devices shown in FIG. 4 to 8 have a high bending strength in a direction parallel to the undulations. These products can be used in buildings, in particular in the construction of ceilings. They can also be used for the package, in particular for the package of brittle cylindrical products.

In some cases it is possible to put comminuted waste from articles of prior manufacture into the hoppers with new pearls.

This comminuted waste is advantageously added in small particles having substantially the dimensions of the expanded pearls themselves and preferably in a middle layer of the product.

It is to be understood that within the scope of the invention a great number of various products having a plurality of layers can be obtained by varying the characteristics of the different layers. These layers can have different compositions and be constituted of polystyrene or polysulfone pearls, comprising or not products providing self-extinguishing properties. The density of each layer can be preferably comprised between 8 and 40 kg. per cubic meter, corresponding substantially to densities of 4 to 20 kg. per cubic meter of the expanded pearls.

Products comprising two layers can be realized.

As an example, a particularly interesting product can be obtained, comprising two layers of polystyrene pearls, the first layer having a thickness of 1 centimeter and a density of 30 kg. per cubic meter and the second layer a thickness of 4 centimeters and a density of 8 kg. per centimeter. Such a product has an average density of 12,4 kg. per cubic meter with an impermeability and a punching strength improved with respect to an homogeneous product having this same density, as well as a greater ability to receive a coating such as a stuck plastic film or bituminated paper.

Advantageous products, comprising three layers can also be obtained.

According to a first example, the two external layers are identical, constituted by polystyrene, have a thickness of 30 millimeters and a density of 12 kg. per cubic meter, and comprise products providing self-extinguishing properties, while the internal layer, which does not comprise such products, has a thickness of 60 millimeters and a density of 20 kg. per cubic meter. The product obtained is a thick panel having a great fire resistance and also a good impermeability to water and vapor.

According to a second example the two external layers are both constituted by polystyrene and have a density of 8 kg. per cubic meter and a thickness of 45 millimeters, while the internal layer has a density of 30 kg. per cubic meter and a thickness of 10 millimeters. The product obtained has an average density of 10.2 kg. per cubic meter. Its bending strength as well as its impermeability to water and vapor is highly improved.

Interesting products can be obtained with the combination of polysulfone and polystyrene.

According to an example of these products comprising three layers, two external layers are both constituted by polysulfone and have a density of 60 kg. per cubic meter and a thickness of 10 millimeters. The internal layer is constituted by polystyrene and has a density of 15 kg. per cubic meter and a thickness of 90 millimeters. The obtained product has a high resistance to organic solvents.

It is to be noted that in the manufacture of products having a plurality of layers the control of temperature is not substantially modified with respect to the manufacture of products having a single layer. In practice, a temperature of 110°–116° C. is usually reached in all the thickness of the product at the exit of the heating device. The compression obviously depends upon the average density to be obtained and reaches 4 T/m.$^2$ for a density of 20 kg. per cubic meter and 6 T/m.$^2$ for a density of 30 kg. per cubic meter.

As many apparently widely different embodiments of the present invention may be made without departing from the spirit and scope thereof, it is to be understood that the invention is not limited to the specific embodiments.

What is claimed is:

1. Polystyrene plyboard having at least one ply of autogenously interconnected, compressed polystyrene pearls which is autogenously connected to at least one other ply of autogenously interconnected, compressed pearls which differ from the pearls of said one ply in at least one of the factors of constitution, size, and density.

2. Polystyrene plyboard according to claim 1 in which said other ply comprises polystyrene pearls.

3. Polystyrene plyboard according to claim 1 in which said other ply comprises polysulfone pearls.

4. Polystyrene plyboard according to claim 1 in which said one ply comprises fine pearls and said other ply comprises relatively coarse pearls.

5. Polystyrene plyboard according to claim 1 in which the pearls of at least one ply include a first retardant in their composition from the class consisting of halogenated hydrocarbons and halogenated organic phosphenates.

6. Polystyrene plyboard according to claim 1 comprising three autogenously interconnected plies of which the outer plies are of fine polystyrene pearls and the inner ply is of larger pearls.

7. Laminated, cellular plyboard comprising a ply of expanded polystyrene pearls autogenously welded to a different but compatible cellular ply and being of substantially uniform thickness and zigzag construction.

8. The product of claim 7 having dense cellular outer plies and bonded thereto an inner ply of less density.

9. Plyboard of zigzag construction having a plurality of plies autogenously welded one to the other, each ply being composed of expanded and compressed pearls of thermoplastic resin of which at least one ply is polystyrene, the pearls in each ply being autogenously welded to contiguous pearls.

10. Plyboard according to claim 9 comprising an inner cellular ply between contiguous cellular plies of greater density.

* * * * *